Dec. 5, 1944.   A. O. DANIELS ET AL   2,364,131
BALANCED AIRSCREW BLADE
Filed Sept. 5, 1942   2 Sheets-Sheet 1

INVENTORS:
ALBERT O. DANIELS
HENRY V. GERMAN
BY Francis E. Boyce
ATTORNEY

INVENTORS:
ALBERT O. DANIELS
HENRY V. GERMAN
BY Francis E. Boyce
ATTORNEY

Patented Dec. 5, 1944

2,364,131

UNITED STATES PATENT OFFICE 2,364,131

BALANCED AIRSCREW BLADE

Albert Oliver Daniels, Chesham, Bucks, and Henry Victor German, Howgate, Bembridge, Isle of Wight, England, assignors to Hordern-Richmond Limited, Haddenham, Buckinghamshire, England, a company of Great Britain Application September 5, 1942, Serial No. 457,504 In Great Britain October 17, 1941

2 Claims. (Cl. 170—159)

This invention relates to the balancing of individual blades of airscrews, and the like.

It is of course appreciated that individual blades of airscrews and the like, particularly those designed to operate at high speeds have to be carefully balanced statically both horizontally and vertically and must also be balanced dynamically and aerodynamically.

It is known to adjust for vertical balance by making small alterations to aerofoil sections but this is detrimental to aerodynamic balance.

The empirical method of adding weights to the root end is also known but this alters the mass weight of the blade thereby affecting the horizontal balance.

The object of the present invention is to provide means for effecting vertical balance of individual airscrew blades statically, without the above-mentioned disadvantages.

The present invention consists in the provision at or in the base or root end of a blade of two or more moment masses which may be of equal moment, adjustable about a common centre situated on the axis of the blade root or centre line of adaptation of blade to hub. The moment masses may be in adjacent planes so as to be movable one over the other or may be in the same plane. The masses of two equal moment masses would be in balance when diametrically opposed or with more than two moment masses of equal moment these would be in balance when symmetrically arranged. By rotating these moment masses about their common centre any degree of error in vertical balance of the blade may be corrected up to the maximum of mass moment obtained when the moment masses are set so that the mean moments of all are directly in line and on the same side of the centre, in the case of moment masses which are arranged in superimposed planes. In the case of moment masses arranged in the same plane the maximum moment will be obtained when the moment masses are touching one another.

The moment masses may be mounted on a central support or by peripheral location and may be within or on the root end and in either case a centrally disposed adjustable or variable mass may be provided for adjustment of horizontal balance, for instance, a central tube may be provided, within which may be placed a balance weight which may be adjustable axially of said tube.

It will be realised that the form of these moment masses may be varied to suit different designs of blade root and may consist of superimposed or of concentrically disposed eccentric masses.

Whilst two equal moment masses of suitable moment can be adjusted to correct any amount of vertical out of balance there may be occasions where it is known that the average blade of any one type when finished is always out of vertical balance in one direction due, for example, to the presence of a metal leading edge or the type of covering used. In such a case the use of a third moment mass positioned to correct the average known error would enable the two remaining equal moment masses to be used for fine adjustment of the balance.

Where the diameter of the space available for positioning the said moment masses is limited the desired moment may be obtained by coupling together two or more sets of moment masses to be operable in unison in the manner employed in coupling together the vanes of a variable electric condenser, such as is used in the tuning circuit of a wireless receiver.

Reference will now be made to the drawings filed herewith, wherein.

Figure 1:
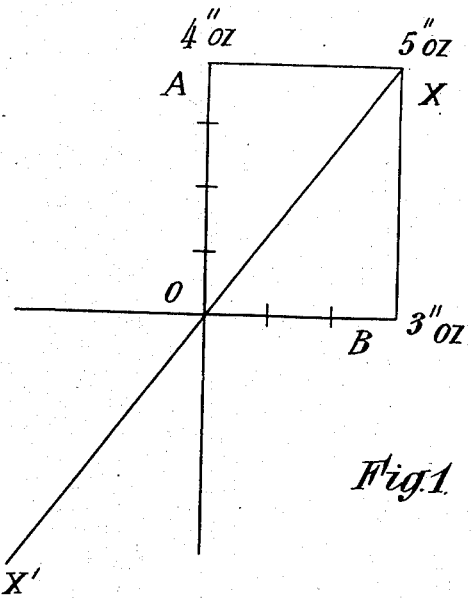
Fig. 1 is a diagram of forces.

In Fig. 1 it has been ascertained that the airscrew blade under test is out of balance vertically to the extent of 4″ oz., in the direction of the ordinate OA and 3″ oz. in the direction of the abscissa OB. The resultant of these two forces is represented by the line OX.

Figure 2:
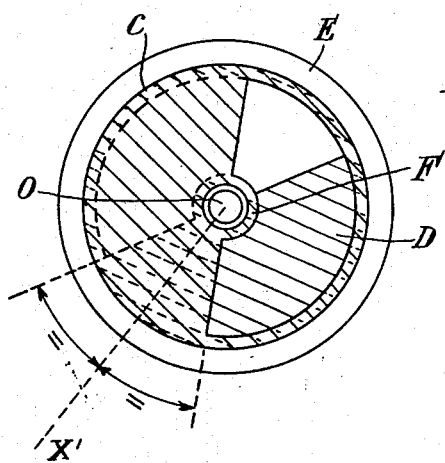
Fig. 2 is an end view of a root end showing one embodiment of the invention having two equal moment masses adjusted to correct the error shown in Fig. 1.

Referring now to Fig. 2 the two moment masses C and D are adjustably mounted in superposed relation in the root end E about a central axis O. It will be seen that each moment mass is formed by removing a semi-circular shaped portion from a solid disc. The rimlike portion left surrounding the hollow from which a part of the mass has been removed serves as a support for the complementary moment mass and maintains their relative axial position in the root end irrespective of the angular position.

The two cams C and D shown in Fig. 2 have been turned so that they overlap in the left hand bottom area and the centre line OX′ of the overlapping portion is parallel to the resultant OX in Fig. 1. By adjusting the amount of overlap whilst retaining the direction of the centre line OX' of the overlapping portion the resultant force OX is counterbalanced. The limits within which the adjustment can be made is from zero to double the mass moments, i. e. the combined mass moments. Since the moment masses are not moved axially in the root end E but are disposed within the root end E no alteration of the horizontal balance takes place and the dynamic balance is not affected.

In the form shown in Fig. 2 it will be noted that the central support for the two moment masses consists of a tube F in which an axially adjustable mass may be disposed for the purpose of effecting horizontal balance.

In order to avoid or correct any couple formed by said moment masses being in a different plane of rotation to that of the airscrew being balanced the moment masses may be duplicated so as to be arranged in complementary pairs for suitable adjustment by which the avoidance or correction of any couple may be effected.

Figure 3:
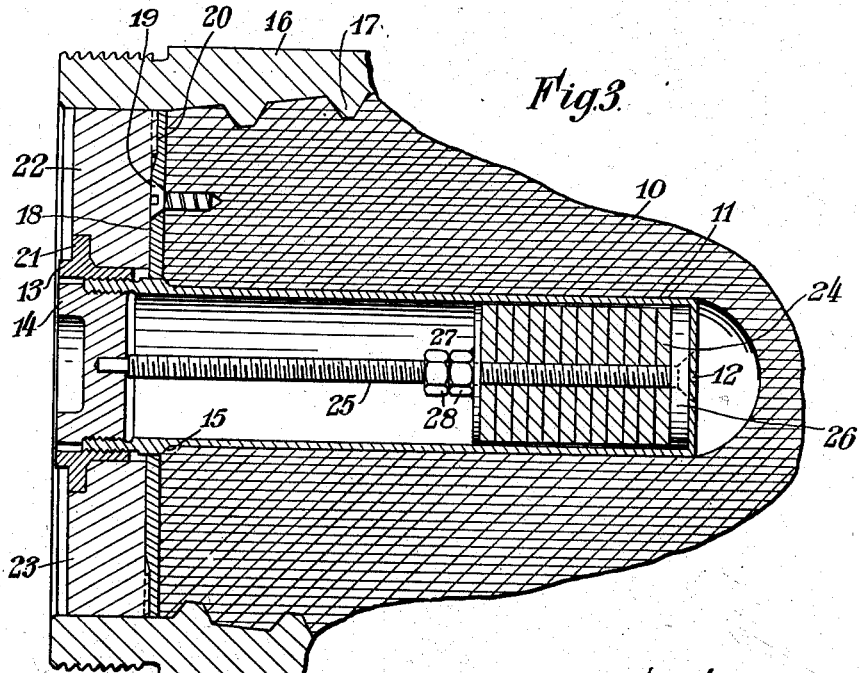
Fig. 3 is a longitudinal sectional view of a root end showing a modified form of moment masses according to the invention also adjusted to correct the error shown in Fig. 1.
Figure 4:
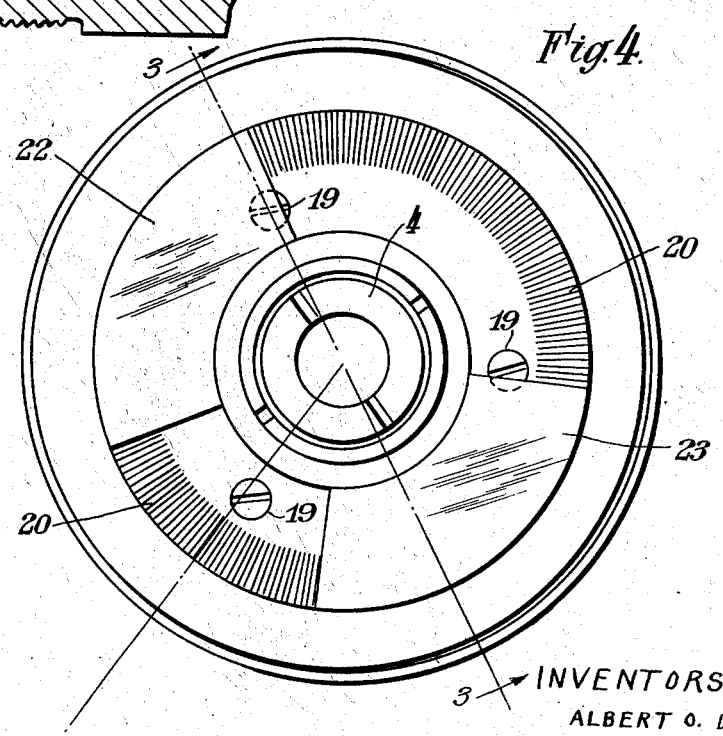
Fig. 4 is an end view of the root end shown in Fig. 3.

Referring now to the modified construction shown in Figs. 3 and 4, Fig. 3 being a section on the line 3—3 of Fig. 4 looking in the direction of the arrows, the root end 10 is bored longitudinally to receive a sleeve 11 closed at the inner end, the bottom of the bore being hemispherical. The inner end of sleeve 11 is provided with a small aperture 12 to permit of the escape of air as the sleeve is forced into the bore. The sleeve 11 is a close fit within the bore and before insertion the bore is coated with a suitable adhesive. After the sleeve 11 has been inserted the aperture 12 is closed and sealed in any convenient way to prevent moisture from gaining access to the interior of the root end.

The open end of the sleeve 11 is threaded on the outside to receive a nut 13 and on the inside to receive a plug 14 the two threads being of opposite sense. The sleeve 11 is formed with a shoulder 15 near the outer end having a chamfer which is adapted to contact the root end 10 and act as a stop to limit the insertion of the sleeve. The root end 10 is shown secured in a socket 16 provided in the usual manner with threads 17. Mounted on the root end 10 within the socket 16 and surrounding the sleeve 11 is a plate 18 secured by three screws 19 and having a band of radial serrations 20 disposed near the periphery. Conveniently the number of said radial serrations may be 360.

The nut 13 is formed with a flange 21 which serves as a retaining flange. Two moment masses 22 and 23 respectively are mounted within the socket 16 and are located on the periphery of the nut 13 being held pressed against the serrations 20 by flange 21 of the nut 13. The moment cams 22 and 23 are formed with corresponding radial serrations to engage the radial serrations 20.

It will be seen that on loosening the nut 13 the moment masses 22 and 23 can be moved angularly with respect to each other and, for example, may be set and secured in the position shown in Fig. 4 to provide a mass moment for correcting an out of balance similar to that shown in Figs. 1 and 2.

Disposed within the sleeve 11 are a number of lead discs 24 carried on a threaded rod 25 having a head 26 the lead discs being clamped against the head 26 by a plate 27 and nuts 28. The end of the threaded rod 25 is located in the plug 14 which serves to keep the head 26 pressed against the closed inner end of the sleeve 11. The mass of the lead discs 24 is determined by the mass required to effect horizontal balance of the blade to a master blade. The vertical balance of the blade is effected by adjustment of the moment masses 22 and 23. Means may be provided for locking the nut 13 and plug 14 together thereby locking both to the sleeve 11 since the threads of the nut and plug are of opposite sense.

While the description of the invention has been limited to the method and apparatus for balancing individual airscrew blades it is to be understood that the invention can be applied to the balancing of any form of individual blade for a propeller, fan or the like, all of which are to be regarded as included in the expression "airscrew blade."

What we claim and desire to secure by Letters Patent is:

1. In combination with the root end of a blade, a cylindrical sleeve secured in a longitudinal bore of the root end of the blade and exteriorly threaded at the outer end, a socket secured to said root end and extending longitudinally thereof and projecting beyond the same, a stationary annular plate arranged within the socket and surrounding said sleeve and provided with radial serrations, a plurality of segmental moment masses arranged within said socket and adjustable around the sleeve and provided with radial serrations engaging serrations of said plate, and a nut mounted on the threaded end of the sleeve and engaging the moment masses and maintaining the serrations thereof in engagement with serrations of said plate.

2. In combination with the root end of a blade, a cylindrical sleeve secured in a longitudinal bore of the root end of the blade and exteriorly threaded at its outer end, a socket secured to said root end and extending longitudinally thereof beyond the same, a stationary annular plate arranged within the socket and surrounding said sleeve and provided with radial serrations, a nut mounted on the threaded end of the sleeve and provided with a laterally projecting retaining flange, and a plurality of segmental moment masses mounted within the socket and located on and adjustable around the periphery of the nut and provided with radial serrations engaging serrations of said plate and maintained in such engagement by the retaining flange of the nut.

ALBERT OLIVER DANIELS.
HENRY VICTOR GERMAN.